Patented June 30, 1942

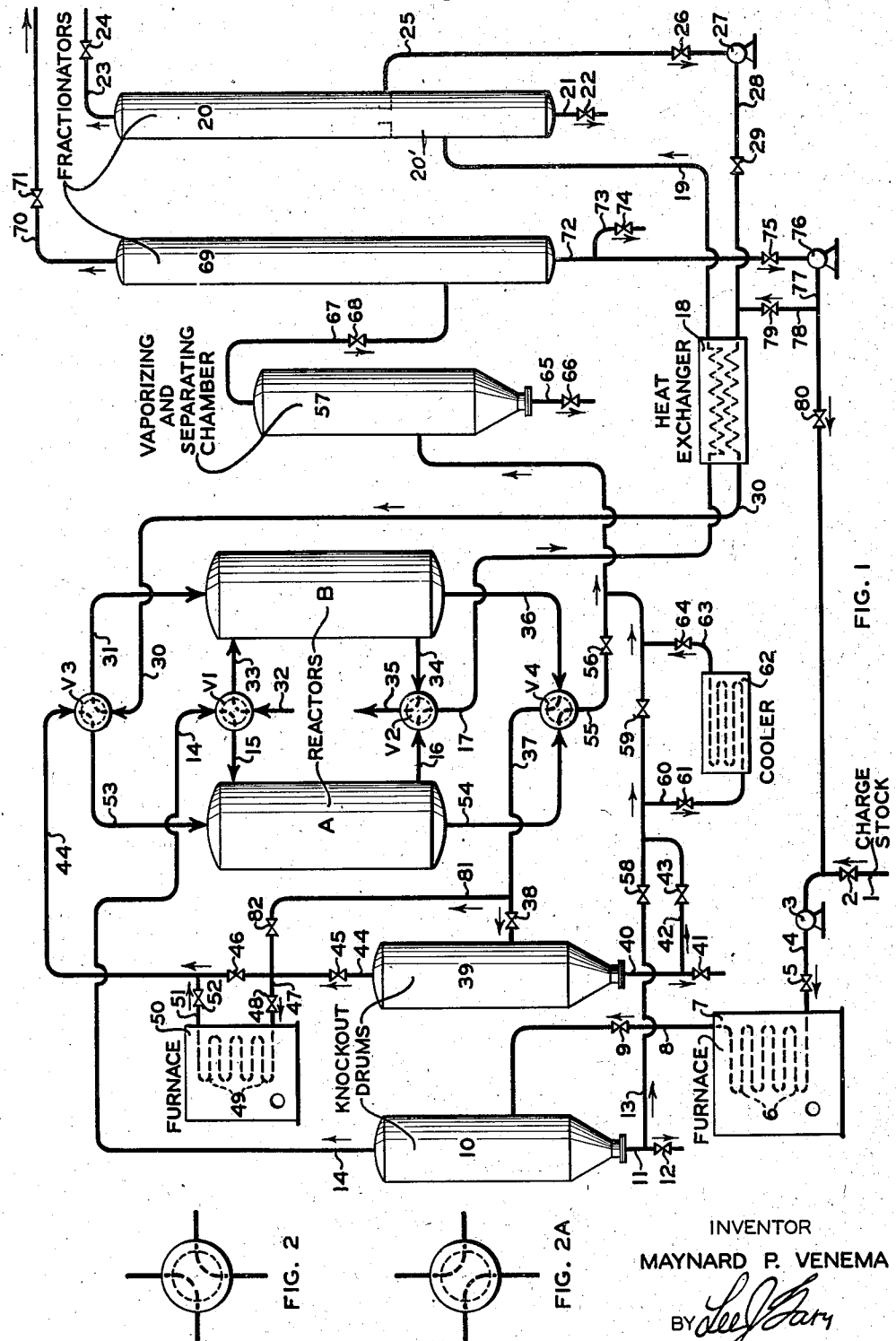

2,287,918

UNITED STATES PATENT OFFICE 2,287,918

HYDROCARBON CONVERSION

Maynard P. Venema, Chicago, Ill., assignor to Universal Oil Products Company, Chicago, Ill., a corporation of Delaware Application August 21, 1940, Serial No. 353,514

12 Claims. (Cl. 196—48)

This invention relates to a process for the production of gasoline from hydrocarbon oil heavier than gasoline and more specifically it is concerned with a catalytic cracking process in which insufficiently converted hydrocarbons formed in the conversion treatment are employed as convective fluid to supply the endothermic heat of cracking to the conversion step and withdraw exothermic heat of reactivation from the catalyst reactivation step.

In the catalytic cracking of hydrocarbons at elevated temperatures wherein conversion is usually accomplished at temperatures above 800° F., the reaction is endothermic requiring the addition of heat to obtain high conversions per pass of the hydrocarbon reactants. Usually in commercial practice, fluid media such as combustion gases or molten metal salts are employed as the heat convective medium with provisions for heating or cooling these materials by external means. It is common practice to pass the fluid heat convective medium in indirect heat exchange relationship with the mass of catalytic material undergoing reactivation, and after adjusting the heat content of the fluid heat convective material, thereafter pass it in indirect heat exchange relationship with the mass of catalytic material employed in processing. By this method, at least a portion of the necessary heat of conversion is obtained from reactivation of the carbonized catalytic material.

One object of the invention therefor is to employ insufficiently converted hydrocarbons formed in the catalytic conversion treatment as the heat convective medium to remove heat from the reactor containing catalytic material undergoing reactivation, and supply heat to the reactor containing catalytic material used in processing. Since the temperatures to which these insufficiently converted hydrocarbons are heated during the time they are used as the heat convective medium will ordinarily be sufficient to effect thermal cracking, reaction products formed in this treatment are supplied to a fractionator wherein fractionated vapors boiling substantially in the range of gasoline are separated from the heavier reaction products. According to one method of operation, these heavier reaction products may be commingled with the insufficiently converted hydrocarbons from catalytic cracking for further use as the heat convective medium.

In another manner of operation, all or a portion of the liquid conversion products formed by fractionation of the vaporous thermal conversion products may be supplied to the catalytic conversion step for further treatment in commingled state with the charging oil.

In catalytic cracking processes wherein insufficiently converted hydrocarbons are returned to the catalytic conversion step, it has been found that the carbon formation during conversion will ordinarily be greater than that formed in the cracking of a clean virgin oil and that the carbon formation in the former case may sometimes exceed three times that formed in the latter case. It has also been shown that if the insufficiently converted hydrocarbons from the catalytic conversion step, which contain large amounts of aromatics, cyclo-olefins and diolefins and other unsaturated hydrocarbons which tend to form carbonaceous materials when brought in contact with the catalytic material, are treated thermally and the vaporous reaction products from the thermal treatment, preferably after the separation of gasoline, are returned to the catalytic conversion step, carbon formation is materially reduced.

Another object of this invention therefor is to effect a thermal treatment of the insufficiently converted hydrocarbons from the catalytic conversion step while they are used as a heat convective medium whereby to form a non-vaporous liquid residue from the unsaturated hydrocarbons above referred to, which is separated from the clean vaporous reactants in a vaporizing and separating step, and said clean vaporous reactants, preferably after the separation of gasoline, returned to the catalytic conversion step. With this method of operation, relatively high yields of catalytically cracked gasoline may be obtained with a relative low formation of carbonaceous substances during conversion.

In one embodiment the invention comprises passing vapors of a hydrocarbon oil through a reaction zone containing a mass of contact material and therein effecting catalytic cracking of the vapors, fractionating resulting vaporous conversion products to separate fractionated vapors of the desired end-boiling point from the insufficiently converted heavier liquid hydrocarbons, passing the latter through a reaction zone in indirect heat exchange relationship with contact material undergoing reactivation and thereby thermally cracking the same, thereafter passing resulting hot thermal conversion products from the last mentioned reaction zone in indirect heat exchange relationship with the contact material in the first mentioned reaction zone to supply heat thereto and partially cool said thermal conversion products, fractionating the thus partially cooled thermal conversion products to separate fractionated vapors of the desired end-boiling point from reflux condensate, and subjecting resulting reflux condensate to further cracking treatment in the same system.

In another embodiment of the invention the process described above may be modified by further heating and thermally cracking the converted hydrocarbons leaving the reaction zone containing catalytic material undergoing reactivation, passing the resulting products in indirect heat exchange relationship with the contact material used in processing, fractionating resulting thermal conversion products leaving the last mentioned reactor to separate fractionated vapors of the desired end-boiling point from reflux condensate, and supplying said reflux condensate to the catalytic cracking step.

Figure 1 of the accompanying diagrammatic drawings illustrate in conventional side elevation one specific form of the apparatus in which the process of the invention may be conducted.

Figures 2 and 2A are diagrammatic illustrations of four-way inlet and outlet valves indicated as valves V1, V2, V3, and V4 in Figure 1. Figure 2 illustrates one position of the passageways through the valves and Figure 2A illustrates the passageways shifted to another position.

Figure 3:
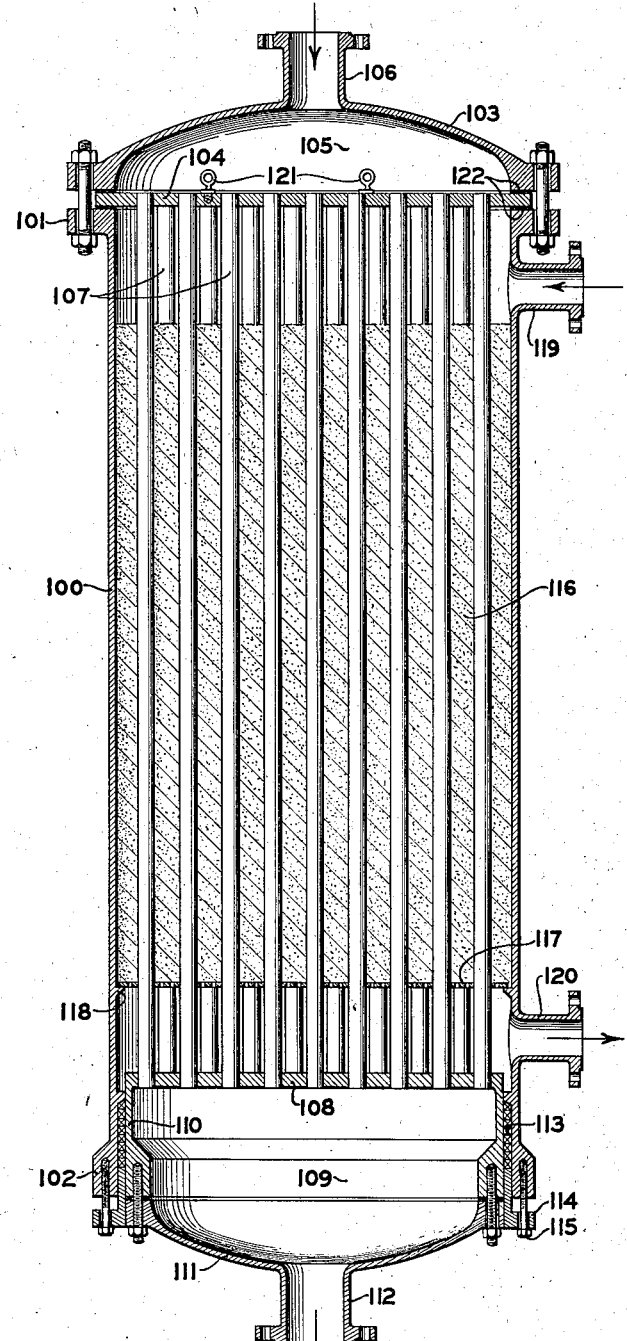
Figure 3 is an elevational view shown in cross-section of one specific form of reactor of the type preferably employed in conducting the process.

Referring now to the Figures 1, 2 and 2A, charging stock comprising, for example, naphtha, kerosene, kerosene distillate, light or heavy gas oil and the like, or any mixture thereof is supplied through line 1 containing valve 2 to pump 3. Pump 3 discharges through line 4 containing valve 5 into heating coil 6 which receives heat from furnace 7. When desired, reflux condensate formed in the manner later described may be commingled with the raw oil charging stock in line 1 and supplied in commingled state therewith to coil 6 in the manner described.

The oil in passing through coil 6 is substantially completely vaporized therein and heated to a temperature ranging, for example, from 800 to 1200° F. The heated vapors leaving coil 6, which in most cases will contain a small amount of unvaporized material, are directed through line 8 containing valve 9 into knockout drum 10 wherein the unvaporized material is separated from the vapors to be catalytically cracked. Non-vaporous residue removed from drum 10 by way of line 11 may be directed through valve 12 and recovered or it may be directed through line 13 for use as a quenching oil in the manner to be later described.

Vaporous reactants leaving drum 10 are directed through line 14 to valve V1 which, in the case here illustrated, is shown as a rotary or plug type valve containing two passageways which may be shifted, as illustrated in Figures 2 and 2A, for the purpose of changing the direction of flow of the streams of reactants and reactivating gases. It is to be understood, of course, that valves V1, V2, V3, and V4 are illustrated as four-way valves merely for the purpose of simplifying the description and that other switching valves and manifold arrangements suitable for accomplishing the same purpose may be substituted for those illustrated. For the purpose of this description, we shall consider reactor A as being on process and the catalytic material in reactor B undergoing reactivation, whereby valves V1 and V3 are each adjusted to the position illustrated in Figure 2 and valves V2 and V4 adjusted to the position illustrated in Figure 2A. In the case here illustrated, vaporous reactants supplied to valve V1 pass therethrough into line 15 by means of which they are introduced to reactor A.

Reactors A and B, in the case here illustrated, preferably comprise reactors of the heat exchanger type, being equipped with a plurality of elongated tubular elements connected in parallel and surrounded by a suitable shell or jacket. The specific form and construction of reactors employed is, of course, optional so long as there is provided two separate zones in heat transfer relation in each reactor. In the case of the tubular reactor, it is usually preferable to dispose the catalytic material in the space within the shell or jacket surrounding the tubes and to pass the heat convective medium through the tubular elements. However, when desired, the contact material or catalyst may be disposed within the tubular elements and the heat convective material passed through the shell or jacket about the tubes. This is not the preferred method, however, since carbon forming material will ordinarily be formed from the recycle stock introduced as the heat convective medium, and such carbonaceous materials are more readily removed from the inside of tubes than from the outside. Figure 3, which will be later described, illustrates one form of reactor of the preferred type.

Catalysts which have been found to be effective in the catalytic cracking of hydrocarbon vapors may comprise pellets or granules of silica or other siliceous and refractory materials composited with compounds selected from the group consisting of alumina, zirconia, vanadia, and thoria. In addition, the hydrosilicates of alumina, acid treated clays, or the like, have also been found to be effective in the cracking treatment of hydrocarbon vapors. Although the catalysts above recited are generally considered to be the preferred catalysts their use is not to be construed as a limiting feature, for various other catalysts well known to those in the art may be employed within the broad scope of the invention.

Vaporous reactants supplied to reactor A are passed in contact with the catalytic material disposed therein and at the same time heat is supplied to the reactor in the manner to be described. The catalytic conversion products leaving reactor A pass through line 16 to valve V2, which is now in the position shown in Figure 2A, wherethrough they pass into line 17 and thence through heat exchanger 18, where the conversion products are partially cooled by indirect heat exchange with cooler insufficiently converted hydrocarbons supplied to heat exchanger 18 in the manner to be later described. The partially cooled conversion products leaving heat exchanger 18 are directed through line 19 into fractionator 20.

Fractionator 20 may be operated at a pressure ranging, for example, from substantially atmospheric to 200 pounds or more per square inch, and preferably in the lower portion thereof a vaporizing zone 20' is provided wherein vaporous conversion products are substantially separated from non-vaporous liquid conversion products and the latter removed by way of line 21 containing valve 22, recovered as a product of the process or subjected to any desired further treatment. Vaporous conversion products separated as above mentioned are fractionated to separate fractionated vapors boiling within substantially the range of gasoline from the higher boiling insufficiently converted hydrocarbons, which latter are condensed in the fractionator as reflux condensate. Fractionated vapors are removed from fractionator 20 by way of line 23 containing valve 24, subjected to cooling and condensation in any suitable conventional manner, not illustrated, and the resulting distillate and gas collected and separated.

Insufficiently converted hydrocarbons separated in fractionator 20 as above mentioned are directed through line 25 containing valve 26 to pump 27. Pump 27 discharges through line 28 containing valve 29 into heat exchange 18 wherein the insufficiently converted hydrocarbons pass in indirect heat exchange relationship with the conversion products introduced to this heat exchanger in the manner previously described. Insufficiently converted hydrocarbons preheated by heat exchange with the conversion products in heat exchanger 18 are conducted through line 30 to valve V3, which is in the position shown in Fig. 2 and wherethrough they pass into line 31 by means of which they are supplied to the non-catalytic zone of reactor B.

In the case here illustrated, the catalytic material in reactor B is undergoing reactivation which is accomplished by introducing heated oxygen-containing reactivating gases to reactor B by way of line 32, valve V1, and line 33, valve V1 being in the position shown in Fig. 2. Combustion products and spent activating gases leave reactor B by way of line 34, valve V2, which is in the position shown in Fig. 2A, and line 35, after which they may be disposed of or a portion thereof may be cooled, the oxygen replenished, and this portion reheated and recycled through to the reactor wherein reactivation of the catalyst is taking place.

Insufficiently converted hydrocarbons supplied to reactor B pass in indirect heat exchange relationship with the reactivating gases and catalytic material whereby to serve as a cooling means for the catalytic material undergoing reactivation therein, and whereby to increase the temperature of the insufficiently converted hydrocarbons. The stream of insufficiently converted hydrocarbons leaving reactor B of a higher heat content than the entering stream, is conducted through line 36 to valve V4, which is in the position shown in Fig. 2A and wherethrough it passes into line 37 and thence through valve 38 into knockout drum 39. Non-vaporous liquid hydrocarbons present in the stream of insufficiently converted hydrocarbons, including those formed during the treatment in reactor B, are separated from the vaporous portion and the former removed from knockout drum 39 by way of line 40 and valve 41, recovered as a product of the process, or subjected to any desired further treatment. When desired, a portion or all of the nonvaporous liquid residue removed by way of line 40 may be directed through line 42 containing valve 43 into line 13 for use as subsequently described. The stream of vapors separated in knockout drum 39 are removed therefrom by way of line 44 containing valve 45 for treatment in the manner to be described. In some cases, the products in line 37 will contain no appreciable quantity of unvaporized material or only a relatively small portion and, in such cases, knockout drum 39 may be by-passed by directing these products through line 81 containing valve 82 into line 44 for treatment in the manner to be described.

Vapors in line 44 comprising either those separated in knockout drum 39 or the total stream from line 37 may be directed through valve 46 to valve V3, for use as subsequently described, or they may, when desired, be directed through line 47 containing valve 48 into heating coil 49 which receives heat from furnace 50. The vapors in passing through coil 49 are heated to a temperature ranging, for example, from 900 to 1100° F., or thereabouts, and the heated vapors from coil 49 are returned to line 44 by way of line 51 containing valve 52, after which they are supplied to valve V3.

Vapors supplied to valve V3 from coil 49, line 81 or chamber 39, as the case may be, pass therefrom through line 53 into the non-catalytic zone of reactor A. Vapors thus supplied to reactor A pass in indirect heat exchange relationship with the contact material and reactants supplied to this reactor in the manner previously described whereby to supply the necessary endothermic heat of catalytic conversion and to prolong the time at which the above mentioned vapors are maintained at a thermal conversion temperature to effect treatment thereof for the removal of carbon forming constituents contained therein.

Reaction products formed in the treatment of the above mentioned vapors in reactor A are directed thruogh line 54 to valve V4 wherethrough they pass into line 55 and thence through valve 56. They are preferably cooled in line 55, and the cooled reaction products are supplied to vaporizing and separating chamber 57. Cooling of the reaction products in line 55 may be accomplished by commingling therewith a portion or all of the nonvaporous liquid residue separated in either or both of the knockout drums 10 and 39, which residue is supplied to line 55 by way of line 13. In the case here illustrated, liquid residue from chamber 10 is directed through line 13 containing valve 58 and, when desired, may be commingled with the liquid residue from knockout drum 39 which is supplied to line 13 in the manner previously described, and the mixture directed through valve 59 into line 55. When desired, the liquid residue in line 13 may be cooled by directing a portion or all of the material in line 13 through line 60 containing valve 61 into cooler 62 and the cooled material returned to line 13 by way of line 63 containing valve 64.

Vaporous reaction products are separated from the non-vaporous liquid reaction products and cooling oil in chamber 57, the liquid residue and cooling oil removed by way of line 65 containing valve 66, recovered as a product of the process or subjected to any desired further treatment. Vaporous reaction products from chamber 57 are directed through line 67 containing valve 68 into fractionator 69 wherein fractionated vapors boiling within substantially the range of gasoline are separated from the higher boiling reaction products, the latter being condensed in fractionator 69 as reflux condensate. Fractionated vapors are removed from fractionator 69 by way of line 70 containing valve 71, subjected to cooling and condensation in any suitable conventional manner, not illustrated, and the resulting distillate and gas collected and separated, by well known means, not illustrated.

Reflux condensate formed as above mentioned is removed from fractionator 69 by way of line 72 and a portion or all may be recovered by way of line 73 containing valve 74. At least a portion, however, and preferably all of the reflux condensate in line 72 is directed through valve 75 to pump 76. Pump 76 discharges through line 77 and preferably a portion of the reflux condensate is directed through line 78 containing valve 79 into line 28, wherein it commingles with the insufficiently converted hydrocarbons from fractionator 20 for further treatment therewith in the manner previously described. The remaining portion or all of the reflux condensate in line 77 may be directed through valve 80 into line 1, wherein it commingles with the charging stock and is subjected therewith to treatment in the manner previously described.

After completing reactivation of the catalytic material in the reactor undergoing reactivation, which, in the case here illustrated, is reactor B, substantially oxygen-free gases are introduced to the reactor to purge therefrom substantially all oxygen-containing gases. After purging is completed the streams of hydrocarbon reactants and reactivating gases are switched from one reactor to the other and, at about the same time, the sequence of flow of the convective fluid through the two reactors is reversed. In the case here illustrated, therefore, when reactivation of the catalytic material in reactor B is completed, valves V1 and V3 are switched from the position illustrated in Figure 2 to the position illustrated in Figure 2A, and valves V2 and V4 are switched from the position illustrated in Figure 2A to the position illustrated in Figure 2.

Then, with reactor B on process and the catalytic material in reactor A undergoing reactivation, hydrocarbon reactants supplied by way of line 14 pass through valve V1 into line 33 by means of which they are supplied to reactor B. The conversion products from reactor B pass through line 34, thence through valve V2 into line 17, the flow thereafter being substantially as previously described. Reactivating gases supplied through line 32 pass through valve V1 into line 15 by means of which they are supplied to reactor A. Spent reactivating gases and combustion products leaving reactor A are directed through line 16 and through valve V2 into line 35, wherefrom they are discharged from the system or recycled in the manner previously mentioned. Insufficiently converted hydrocarbons formed in the catalytic cracking step and supplied to valve V3 by way of line 30 pass therethrough into line 53 by means of which they are introduced to the non-catalytic zone of reactor A, passing in indirect heat exchange relationship with the catalytic material undergoing reactivation. The insufficiently converted hydrocarbons heated in their passage through reactor A are discharged therefrom through line 54 and pass through valve V4 into line 37, the flow thereafter being substantially as described. The heated insufficiently converted hydrocarbons returned to valve V3 by way of line 44 pass therethrough into line 31 by means of which they are supplied to the non-catalytic zone of reactor B, and the reaction products formed during the treatment of the insufficiently converted hydrocarbons leave reactor B by way of line 36, pass through valve V4 into line 55, the flow thereafter being substantially as described.

Referring now to Figure 3, the reactor here illustrated comprises an outer cylindrical shell 100 flanged at the top, as indicated at 101, and provided with a thick wall section at the bottom, as indicated at 102. A removable flanged head 103 is provided at the upper end of the reactor and is releasably bolted, as indicated, to the flanged portion 101 of the outer shell. The space between this removable head and tube sheet 104 defines an inlet compartment 105 to which convective fluid for controlling the temperature of the reaction taking place in the catalytic zone of the reactor is controlled. Inlet nozzle 106, provided in the removable head 103, communicates with this inlet zone.

A plurality of elongated tubular elements 107 extend lengthwise of the reactor shell between tube sheets 104 and 108 and are secured to the tube sheets at their opposite ends in any convenient manner, such as by welding, expanding or the like. Tube sheet 104 is held in place between flange 101 of the shell and the flanged removable head 103, as indicated in the drawings, and suitable gaskets 122 are disposed between tube sheet 104 and the flanges of the head and shell. Of course, when desired, ground joints or other conventional means of maintaining a pressure tight joint at these points may be substituted for the gaskets.

The lower tube sheet 108 comprises, in the case illustrated, an integral portion of a header defining outlet compartment 109 which communicates with inlet compartment 105 through the tubes 107. The outlet header has a side wall 110 and a removable lower head or closure member 111 which is releasably bolted, as illustrated, to the side wall 110. An outlet nozzle 112 is provided in the removable head 111 and communicates with outlet compartment 109.

Suitable packing, indicated at 113, is provided between the side wall 110 of the outlet header and the interior of shell 100 adjacent the lower end of the latter and the follower 114 for maintaining a tight joint at this point is provided with take-up bolts 115 threaded into the lower end of shell 100.

The space about the tubes 107 within the shell of the reactor and between tube sheets 104 and 108 is a zone in which the catalytic cracking reaction and reactivation of the catalytic material takes place. The bed of cracking catalyst, indicated at 116, is disposed within this space and terminates short of the tube sheets 104 and 108. The catalyst bed is supported on a perforate plate 117 spaced from tube sheet 108 and held in place, in the case here illustrated, by spaced lugs 118 provided on shell 100. Alternatively, when desired, the perforate plate which supports the catalyst bed may be welded or otherwise secured to the tubes 107.

An inlet nozzle 119 for the hydrocarbon reactants to be catalytically cracked and reactivating gases is provided on shell 100 adjacent its upper end and communicates with the space about tubes 107 above the upper extremity of the catalyst bed 116. An outlet nozzle 120 for the cracked products and the spent or partially spent reactivating gases is provided on shell 100 adjacent the lower end of the latter and communicates with the space between perforate plate 117 and the lower tube sheet 108.

When the reactor illustrated in Figure 3 is employed as reactor A of Figure 1, nozzle 106 will be connected with line 53, nozzle 112 with line 54, nozzle 119 with line 15 and nozzle 120 with line 16. When the reactor illustrated in Figure 3 is employed as reactor B of Figure 1, nozzle 106 will be connected with line 31, nozzle 112 with line 36, nozzle 119 with line 33 and nozzle 120 with line 34.

It should be noted that in the form of reactor illustrated in Figure 3, the interior of the tubes 107 is accessible for cleaning and the like by means of a turbine or in any other conventional manner by the removal of either or both of the heads 103 and 111 without disturbing the catalyst. Also, by loosening follower 114 and removing the upper head 103, the entire assembly comprising the tubes, tube sheets and lower header may be removed from the shell of the reactor by hoisting the tube assembly upward through the shell, suitable eye bolts 121 being provided on tube sheet 104 by means of which the tube assembly may be grasped to remove it from the shell. This feature permits ready inspection, replacement or repair of the tubes and the catalyst may be conveniently removed from the reactor for replacement by separating the tube assembly from the shell, in the manner described, and may be replaced as the reactor is reassembled. Alternatively, when desired, suitable manways, not illustrated, communicating with the space occupied by the catalyst bed adjacent the upper and lower ends of the latter may be provided in shell 100 for removing and replacing or replenishing the catalyst.

No novelty is claimed for the specific form of reactor illustrated in Figure 3, nor is there any intention that the invention should be limited to the particular form herein illustrated and described. It is recognized that various other forms of reactors may be substituted for the one illustrated without departing from the broad scope of the invention and it is intended that such other forms of reactors which may be used also form a part of this disclosure.

An example of one specific operation of the process as it may be conducted in an apparatus such as illustrated and above described is approximately as follows:

A 33° A. P. I. gravity Mid-Continent gas oil is vaporized and heated to a temperature of 950° F. The heated vapors are supplied to a reactor containing a synthetically prepared silica-alumina-zirconia cracking catalyst at a pressure of approximately 40 pounds per square inch, heat being supplied to the materials undergoing conversion in the manner to be described. The conversion products leaving this reaction zone are cooled in heat exchanger 18 to a temperature of about 800° F. by indirect heat exchange with the insufficiently converted hydrocarbons formed and supplied thereto in the manner to be described. Cooled conversion products are supplied to vaporizing and separating zone 20' wherein non-vaporous liquid residue is separated from the vaporous conversion products and the former recovered as a product of the process. Vaporous conversion products are fractionated to separate fractionated vapors of approximately 400° F. end point from the insufficiently converted hydrocarbons, which latter are condensed in the fractionating zone 20. Fractionated vapors are subjected to cooling and condensation and recovered as a product of the process.

The stream of condensed insufficiently converted hydrocarbons from fractionator 20 are preheated by indirect heat exchange with the conversion products in heat exchanger 18. This preheated stream of insufficiently converted hydrocarbons is supplied to the non-catalytic zone of the reactor containing catalytic material undergoing reactivation and passed in indirect heat exchange relationship with said catalytic material to cool the same and further heat the preheated stream. Vaporous components of the stream of insufficiently converted hydrocarbons discharged from reactor containing catalytic material undergoing reactivation to chamber 39 are further heated in coil 49 to a temperature of approximately 1000° F. preferably with a minimum of thermal cracking in this zone, and the resulting heated vapors are supplied from coil 49 to the non-catalytic zone of the reactor in which catalytic cracking of the charging oil is being accomplished and passed in indirect heat exchange relationship with the catalytic material contained therein and the materials undergoing catalytic cracking, to supply heat to the catalytic cracking reaction. The reaction products resulting from the treatment of these insufficiently converted hydrocarbons are supplied to vaporizing and separating chamber 57 wherein non-vaporous liquid residue is separated from the vaporous reaction products and the former recovered therefrom as a product of the process. The vaporous reaction products from chamber 57 are fractionated in fractionator 69 to separate fractionated vapors of approximately 400° F. end point from the higher boiling insufficiently converted hydrocarbons, which latter are condensed in this zone as reflux condensate. The fractionated vapors separated from the heavier reaction products in fractionator 69 are subjected to cooling and condensation, and the resulting distillate and gases are recovered as products of the process. The reflux condensate formed in fractionator 69 is supplied in part to the catalytic conversion step in commingled state with the charging oil and is, in part, commingled in line 28 with reflux condensate from fractionator 20 and employed therewith as convective fluid in the reactor and subjected to thermal cracking, as described.

From an operation employing conditions such as above specified, one may obtain approximately 55% of 400° F. end point catalytically cracked gasoline of approximately 79 octane number, approximately 14.5% of 400° F. end point thermally formed gasoline of about 70 octane number, about 20% of 8° A. P. I. gravity non-vaporous liquid residue, the balance being chargeable to carbon, gas and loss.

I claim as my invention:

1. A process for the conversion of hydrocarbon oil which comprises vaporizing and heating said oil to a catalytic cracking temperature, separating unvaporized material from vaporous reactants, recovering the former, supplying said vaporous reactants to a reactor comprising a catalytic reaction zone and a non-catalytic reaction zone and therein subjecting the same to contact with a mass of cracking catalyst in said catalytic reaction zone, fractionating the resulting cracked vapors to form reflux condensate and to separate a stream of fractionated vapors, supplying said reflux condensate to a non-catalytic reaction zone of a second reactor and passing the same in indirect heat exchange relationship with catalyst undergoing regeneration in a catalytic reaction zone of the same reactor, heating the reflux condensate leaving said second reactor to a thermal cracking temperature, supplying the resulting heated reflux condensate to the non-catalytic reaction zone of the first mentioned reactor and therein continuing the conversion instigated in the heating step, fractionating the resulting thermally cracked vapors in a fractionating step separate from the first mentioned fractionating step to form reflux condensate and to separate a stream of fractionated vapors, supplying the thermal reflux condensate to the catalytic cracking step, and finally condensing the fractionated vapors.

2. The process of claim 1 further characterized in that catalytic reflux condensate is passed in heat exchange relationship with the catalytically cracked products to cool the latter.

3. The process of claim 1 further characterized in that at least a portion of the thermal reflux condensate is combined with the catalytic reflux condensate for further thermal treatment.

4. The process of claim 1 further characterized in that the catalytic reflux condensate leaving the non-catalytic reaction zone of said second reactor is supplied to a knockout drum to separate liquid residue from vapors and only the latter heated to a thermal cracking temperature in the heating step.

5. A process for the conversion of hydrocarbon oil which comprises vaporizing and heating said oil to a catalytic cracking temperature, separating unvaporized material from vaporous reactants, recovering the former, supplying said vaporous reactants to a reactor comprising a catalytic reaction zone and a non-catalytic reaction zone and therein subjecting the same to contact with a mass of cracking catalyst in said catalytic reaction zone, fractionating the resulting cracked vapors to form reflux condensate and to separate a stream of fractionated vapors, supplying said reflux condensate to a non-catalytic reaction zone of a second reactor and passing the same in indirect heat exchange relationship with catalyst undergoing regeneration in a catalytic reaction zone of the same reactor, heating the reflux condensate leaving said second reactor to a thermal cracking temperature, supplying the resulting heated reflux condensate to the non-catalytic reaction zone of the first mentioned reactor and therein continuing the conversion instigated in the heating step, cooling the resulting thermally cracked products, supplying the cooled products to a vaporizing and separating zone and therein separating non-vaporous liquid residue from thermally cracked vapors, fractionating said thermally cracked vapors in a fractionating step separate from the first mentioned fractionating step to form reflux condensate and to separate a stream of fractionated vapors, supplying the thermal reflux condensate to the catalytic cracking step, and finally condensing the fractionated vapors.

6. The process of claim 5 further characterized in that at least a portion of said unvaporized material is combined with said thermally cracked products to cool the latter below effective cracking temperature.

7. A process for the conversion of hydrocarbon oil which comprises vaporizing and heating said oil to a catalytic cracking temperature, supplying the heated vapors to a reactor comprising a catalytic reaction zone and a non-catalytic reaction zone and therein subjecting the same to contact with a mass of cracking catalyst in said catalytic reaction zone, fractionating the resulting cracked vapors to form reflux condensate and to separate fractionated vapors, supplying at least a portion of said reflux condensate to a non-catalytic reaction zone of a second reactor and therein passing the same in indirect heat exchange relationship with catalyst undergoing regeneration in a catalytic reaction zone of the same reactor to heat said reflux condensate and effect thermal conversion thereof, continuing said thermal conversion in the non-catalytic reaction zone of the first mentioned reactor, fractionating the resulting thermally cracked vapors to form reflux condensate and to separate a stream of fractionated vapors, supplying at least a portion of the last mentioned reflux condensate to the catalytic cracking step, and finally condensing the fractionated vapors.

8. The process of claim 7 further characterized in that the catalytic reflux condensate is subjected to heating in a zone intermediate the two non-catalytic reaction zones further to increase its heat content.

9. The process of claim 7 further characterized in that the thermally cracked vapors are separately fractionated.

10. A process for the conversion of hydrocarbon oil which comprises vaporizing and heating said oil to a catalytic cracking temperature, supplying the heated vapors to a reactor comprising a catalytic reaction zone and a non-catalytic reaction zone and therein subjecting the same to contact with a mass of cracking catalyst in said catalytic reaction zone, fractionating the resulting cracked vapors to form reflux condensate and to separate fractionated vapors, supplying at least a portion of said reflux condensate to a non-catalytic reaction zone of a second reactor and therein passing the same in indirect heat exchange relationship with catalyst undergoing regeneration in a catalytic reaction zone of the same reactor to heat said reflux condensate and effect thermal conversion thereof, supplying the reaction products to a knockout drum and therein separating non-vaporous residue from vaporous reaction products, reheating said vaporous reaction products to a thermal cracking temperature, passing the heated vaporous reaction products through the non-catalytic reaction zone of the first mentioned reactor, cooling the resulting reaction products, separating non-vaporous liquid residue from the thermally cracked vapors, fractionating said thermally cracked vapors in a fractionating step separate from the first mentioned fractionating step to form reflux condensate and to separate fractionated vapors, supplying the thermal reflux condensate to the catalytic cracking step, and finally condensing the fractionated vapors.

11. The process of claim 10 further characterized in that at least a portion of the first mentioned non-vaporous residue is combined with said resulting reaction products to cool the latter.

12. The process of claim 10 further characterized in that at least a portion of said thermal reflux condensate is combined with the catalytic reflux condensate for further thermal treatment.

MAYNARD P. VENEMA.